(12) United States Patent
Liss et al.

(10) Patent No.: US 8,180,882 B2
(45) Date of Patent: May 15, 2012

(54) DISTRIBUTED MESSAGING SYSTEM AND METHOD FOR SHARING NETWORK STATUS DATA

(75) Inventors: Jonathan M. Liss, Marlboro, NJ (US); Sameh A. Sabet, Freehold, NJ (US); Jeffrey A. Deverin, Sayreville, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 1369 days.

(21) Appl. No.: 10/896,541

(22) Filed: Jul. 22, 2004

(65) Prior Publication Data

US 2006/0020686 A1    Jan. 26, 2006

(51) Int. Cl.
*G06F 15/173*    (2006.01)

(52) U.S. Cl. ........ 709/224; 709/225; 709/226; 709/251; 370/252; 370/253; 370/254; 370/255; 370/256; 370/257; 370/258; 714/100; 714/39; 714/47.1; 714/47.2; 714/47.3

(58) Field of Classification Search .................... 709/251
See application file for complete search history.

(56) References Cited

U.S. PATENT DOCUMENTS

| | | | | |
|---|---|---|---|---|
| 5,630,184 | A * | 5/1997 | Roper et al. ................... | 709/221 |
| 5,913,036 | A * | 6/1999 | Brownmiller et al. ........ | 709/224 |
| 6,185,613 | B1 * | 2/2001 | Lawson et al. ................ | 709/224 |
| 6,363,421 | B2 * | 3/2002 | Barker et al. ................ | 709/223 |
| 6,445,774 | B1 * | 9/2002 | Kidder et al. ................ | 379/9.03 |
| 6,564,341 | B1 * | 5/2003 | Sundaram et al. ............. | 714/43 |
| 6,574,197 | B1 * | 6/2003 | Kanamaru et al. ............ | 370/252 |
| 6,597,684 | B1 * | 7/2003 | Gulati et al. .................. | 370/351 |
| 6,813,634 | B1 * | 11/2004 | Ahmed .......................... | 709/224 |
| 6,931,441 | B1 * | 8/2005 | Roden et al. .................. | 709/223 |
| 6,996,583 | B2 * | 2/2006 | Wilmot ................................ | 1/1 |
| 7,076,042 | B1 * | 7/2006 | Praturi et al. ............ | 379/201.01 |
| 7,171,476 | B2 * | 1/2007 | Maeda et al. ................ | 709/227 |
| 7,660,882 | B2 * | 2/2010 | Sun et al. ..................... | 709/223 |
| 2001/0052006 | A1 * | 12/2001 | Barker et al. ................ | 709/223 |
| 2003/0023737 | A1 * | 1/2003 | Johnson et al. ............... | 709/230 |
| 2003/0072271 | A1 * | 4/2003 | Simmons et al. ............. | 370/255 |
| 2003/0108177 | A1 * | 6/2003 | Hsieh et al. .................. | 379/219 |
| 2003/0149754 | A1 * | 8/2003 | Miller et al. .................. | 709/223 |

(Continued)

FOREIGN PATENT DOCUMENTS

JP    H1190148    7/1989

(Continued)

OTHER PUBLICATIONS

European Search Report mailed on Jun. 8, 2007 related to corresponding European Patent Application No. 05254079.6.

(Continued)

*Primary Examiner* — Backhean Tiv (74) *Attorney, Agent, or Firm* — Grossman, Tucker, Perreault & Pfleger, PLLC (57) ABSTRACT

A distributed messaging system and method allows servers in a network to share data, such as network status data associated with all of the servers in the network. In one embodiment, the distributed messaging system and method may be used in element management system (EMS) servers in a distributed network management system (NMS). The servers in the network share the data in a distributed manner by transmitting messages including the network status data, for example, using a star/broadcast method or a circular message queue (CMQ) method.

32 Claims, 9 Drawing Sheets

U.S. PATENT DOCUMENTS

| | | |
|---|---|---|
| 2003/0195892 A1 | 10/2003 | Dhanda |
| 2003/0200338 A1* | 10/2003 | Fulghum et al. ............. 709/248 |
| 2004/0018839 A1* | 1/2004 | Andric et al. ................. 455/433 |
| 2004/0062265 A1* | 4/2004 | Poledna ........................ 370/442 |
| 2004/0103179 A1* | 5/2004 | Damm et al. ................. 709/223 |
| 2004/0248573 A1* | 12/2004 | Wandel ...................... 455/435.1 |
| 2005/0007964 A1* | 1/2005 | Falco et al. .................. 370/256 |
| 2005/0060390 A1* | 3/2005 | Vakil et al. ................... 709/220 |
| 2005/0176429 A1* | 8/2005 | Lee et al. ...................... 455/436 |
| 2005/0207413 A1* | 9/2005 | Lerner .......................... 370/389 |
| 2005/0229152 A1* | 10/2005 | Connell et al. ................ 717/104 |
| 2006/0020686 A1* | 1/2006 | Liss et al. ..................... 709/219 |
| 2006/0030299 A1* | 2/2006 | Wandel ...................... 455/412.1 |
| 2006/0080424 A1* | 4/2006 | Sun et al. ..................... 709/223 |
| 2008/0034251 A1* | 2/2008 | Singhal et al. ................... 714/5 |
| 2010/0061369 A1* | 3/2010 | Suzuki .......................... 370/390 |

FOREIGN PATENT DOCUMENTS

| | | |
|---|---|---|
| JP | H08286989 | 7/1989 |
| JP | H11220466 | 8/1999 |
| JP | 2000040047 | 2/2000 |
| JP | 200049778 | 5/2000 |
| JP | 2001243137 | 9/2001 |
| JP | H09186686 | 8/2009 |
| WO | WO00/17755 | 3/2000 |
| WO | WO00/51001 | 8/2000 |

OTHER PUBLICATIONS

Japanese Office Action dated Sep. 6, 2010 issued in related Japanese Patent Application No. 2005-212019.

Japanese Office Action dated Apr. 22, 2011 issued in related Japanese Patent Application No. 2005-212019.

* cited by examiner

DISTRIBUTED MESSAGING SYSTEM AND METHOD FOR SHARING NETWORK STATUS DATA

TECHNICAL FIELD

The present invention relates to data sharing in a network and more particularly, to a distributed messaging system and method that allows element management systems (EMSs) to share network status data in a distributed network management system (NMS).

BACKGROUND INFORMATION

Network management may be conducted at different levels in various types of networks to avoid network failures and to assure network performance. In a communication network, an element management system (EMS) may be used to supervise and manage network elements within a network. A communication network may also include a network management system (NMS) to manage the overall network by communicating with several EMSs, which manage smaller domains of the network.

In an optical communication system, for example, terminal or cable stations may be interconnected by cable segments to form a network. The network elements in an optical communication system may include equipment located at a cable station (e.g., terminal equipment and power feed equipment) as well as equipment connected to the cable station (e.g., repeaters and equalizers). In such a system, an EMS may be located at a cable station (or at a separate location) and used to manage the network elements associated with this cable station. The EMS may include one or more servers for performing the management functions and one or more workstations for providing a user interface (e.g., to display the information associated with the network elements managed by the EMS). An NMS may be located at one of the cable stations or at a separate location for managing the overall optical communication system or network.

The management of a network may include configuration management, fault management and performance management. An EMS can provide fault management by retrieving, storing and/or displaying alarm, event and system messages forwarded by the network elements managed by the EMS. An EMS can provide performance management by retrieving, storing, displaying and/or measuring transmission quality data. A NMS can provide fault management and performance management for the entire network by managing all of the alarm, event and system messages and the transmission quality data forwarded by each EMS. The NMS may display fault and performance information received from each EMS on a network topological map.

Figure 1:
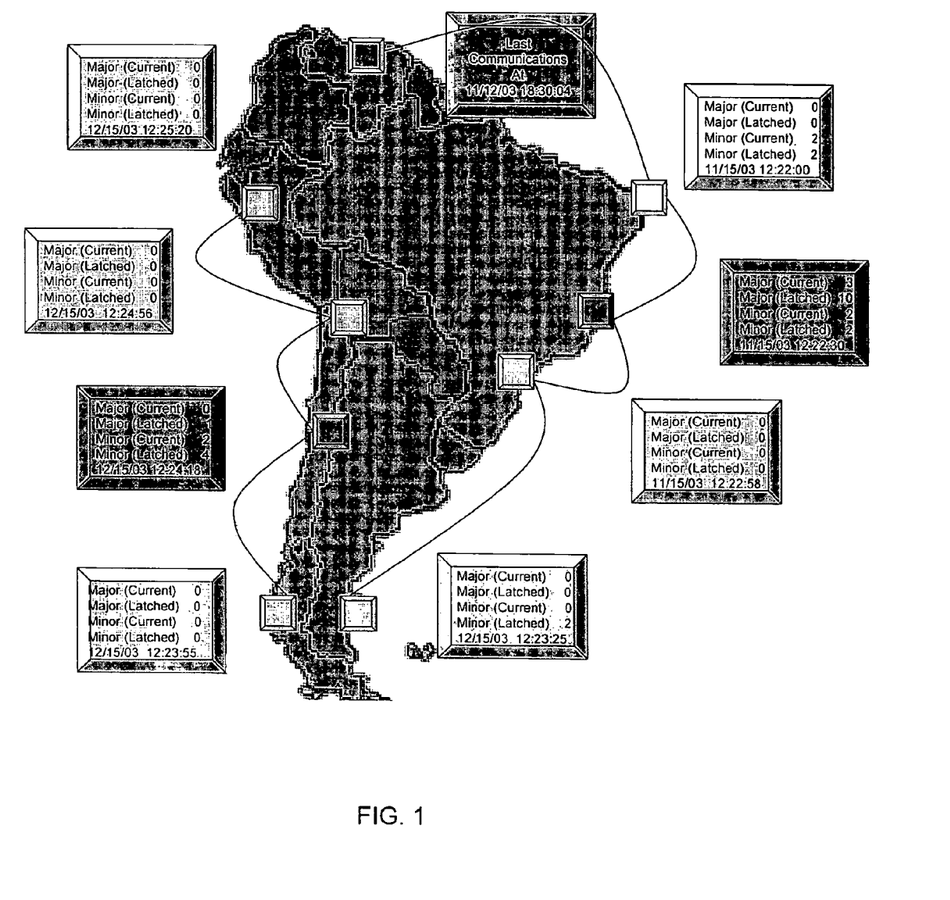
FIG. 1 is an illustration of a graphical user interface (GUI) for a network management system (NMS).

One type of information that may be displayed by an NMS is the network alarm status as managed by the underlying EMSs, as shown in FIG. 1. A user (e.g., a network administrator or operator) may monitor the displayed information to determine if the network alarms indicate failures in a network, which may cause network outages. Alarm summary information may indicate the level of alarm (e.g., major, minor, none, unavailable/not reporting), and the alarm count of major and minor alarms.

Figure 2:
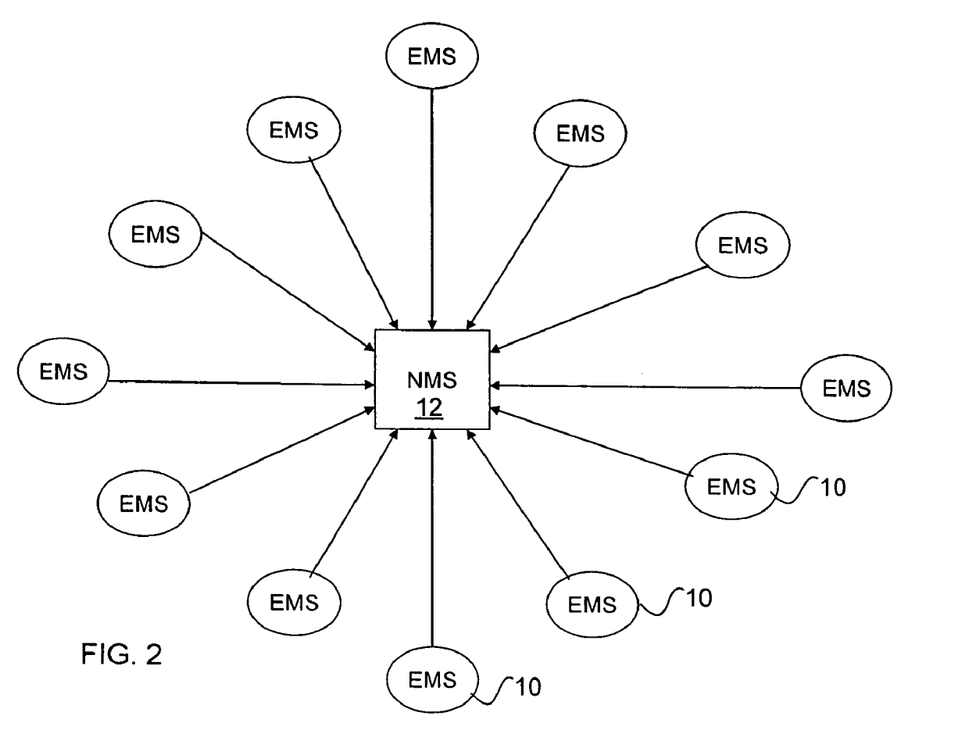
FIG. 2 is a schematic diagram illustrating a hierarchical approach to sharing data between element management systems (EMSs) and a NMS.

As shown in FIG. 2, alarm status information may be communicated between each EMS server 10 and an NMS 12 using a hierarchical approach. According to one implementation, one or more computers at the NMS may be configured as one or more servers (e.g., a single server or redundant servers) that receive information from EMS servers 10. The NMS may then display the alarm summary information for every EMS in the network (e.g., as shown in FIG. 1).

According to another possible implementation, a NMS may be formed without a physical NMS server or layer by distributing the NMS functionality to the EMS servers (i.e., a mini-NMS feature built into each EMS). With a distributed NMS that does not have a NMS layer, however, it is still desirable to provide a summary view of the status of the complete network. To accomplish this, each EMS may communicate with a single "master" server by presenting the highest level alarm status to the "master" server. In turn, the "master" server provides to each EMS server a consolidated view of the alarm status for all of the EMS servers throughout the network. The alarm summary information of every EMS in the network (e.g., as shown in FIG. 1) may then be displayed on the EMS workstations. Thus, this distributed NMS approach also uses a hierarchical approach, i.e., with a master EMS server instead of a NMS server.

Although the hierarchical approach to communicating alarm status data may work for small systems with simple data communication networks (i.e., small numbers of EMS servers), performance and reliability may be compromised in larger systems, for example, when the number of EMS servers approach that found in undersea optical communication systems. The simple TCP/IP client/server based communication model available for distributed NMS systems can be inefficient and may require processing and transmission resources. System operation is also heavily dependent upon the NMS server or the master server, which bears the brunt of processing and may be a single point of failure. If the NMS server or the master server fails, the alarm and status sharing feature may fail.

Accordingly, there is a need for a distributed messaging system and method that enables sharing of network status data between servers, such as EMS servers, in a manner that is relatively simple and reliable.

BRIEF DESCRIPTION OF THE DRAWINGS

These and other features and advantages of the present invention will be better understood by reading the following detailed description, taken together with the drawings wherein.

DETAILED DESCRIPTION

In general, a distributed messaging system and method consistent with the present invention allows information or data that is changing to be shared across a network. In the distributed messaging system, servers in the network may exchange messages including data for all of the servers in the network. Because each server updates the message data associated with that specific server before exchanging the message, distributed messaging allows each server to maintain current data for all of the servers in the network. The servers may also be time synchronized to coordinate the distributed messaging across the network.

According to the exemplary embodiments described herein, the servers may include element management system (EMS) servers that use distributed messaging to share network status data using a network management system (NMS) data communications network (DCN). As used herein, the term server refers to software and/or hardware that manages network resources and is not limited to a single computer or device. In one type of EMS, the network status data includes EMS alarm status data representing alarms forwarded to the EMS by network elements being managed by the EMS. In addition to alarm status, the network status data may include other types of information to be shared between EMSs such as the state of line monitoring equipment or other EMS status data. The present invention is not limited, however, to alarm status data or EMS status data. Network status data, as used herein, may include any type of data relating to the status of a network in general and/or one or more specific network elements in the network.

The distributed messaging system and method may be used in a distributed NMS, for example, to support a "mini-NMS" function at the EMS level by sharing mini-NMS data (MND) between EMS servers in the distributed NMS. Some of the shared network status data (e.g., the summary alarm information) may be displayed using a user interface, for example, using a graphical user interface (GUI) on a client workstation logged into the EMS server. Other shared network status data (e.g., the EMS status data) may be used by EMS applications as they perform EMS functions. One example of a distributed NMS is the Tyco Element Management System (TEMS) available from Tyco Telecommunications (US) Inc. The distributed messaging system and method may also be used with other distributed or non-distributed EMS/NMS configurations known to those skilled in the art.

Figure 3:
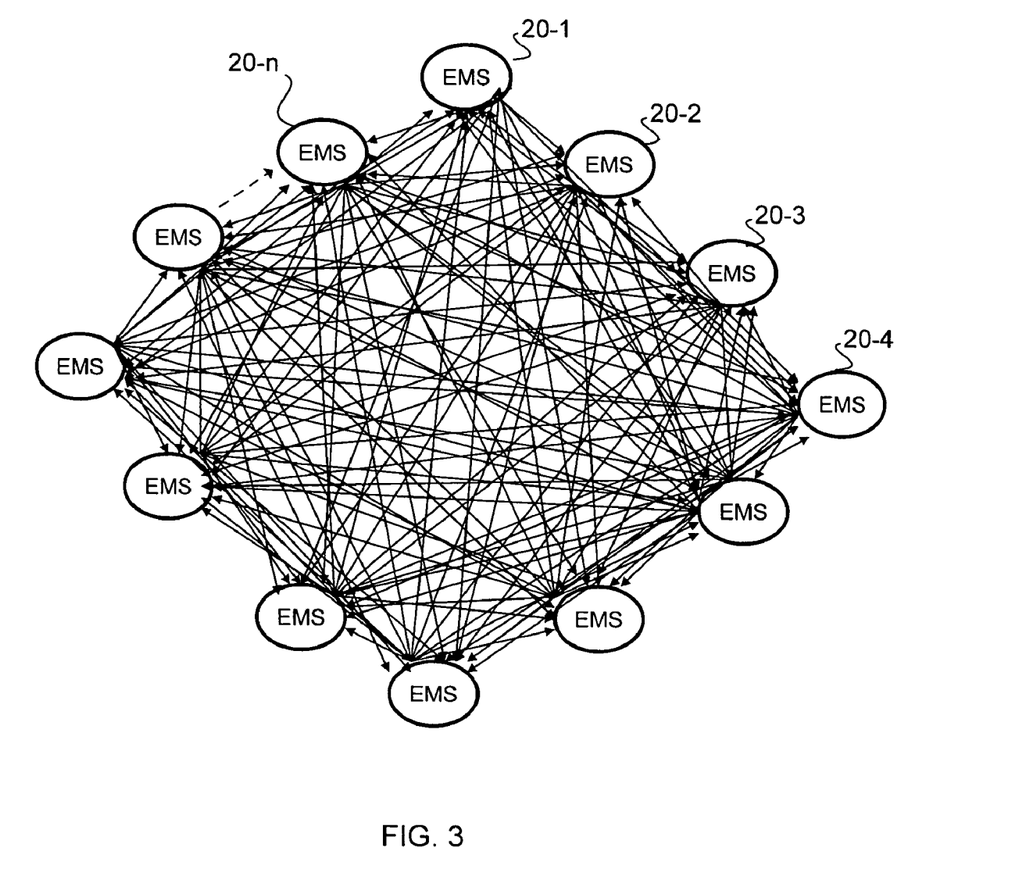
FIG. 3 is a schematic diagram illustrating a distributed messaging approach to sharing data between EMSs consistent with one embodiment of the present invention.

Referring to FIG. 3, EMS servers 20-1 . . . 20-n share network status data (e.g., alarm status data and EMS status data) between the EMS servers 20-1 . . . 20-n. Using distributed messaging, each of the EMS servers 20-1 . . . 20-n in the network transmits and receives messages including network status data associated with all of the EMS servers. The EMS servers may transmit the messages to other registered EMS servers, for example, using a star/broadcast method in which the EMS servers broadcast messages to the other servers or using a circular message queue (CMQ) method in which the EMS servers 20-1 . . . 20-n transmit messages to neighboring servers, as will be described in greater detail below. Additional messages may be transmitted to determine if one or more of the EMS servers 20-1 . . . 20-n are not reporting or unavailable, for example, because the server is down or a DCN link is down.

Figure 4:
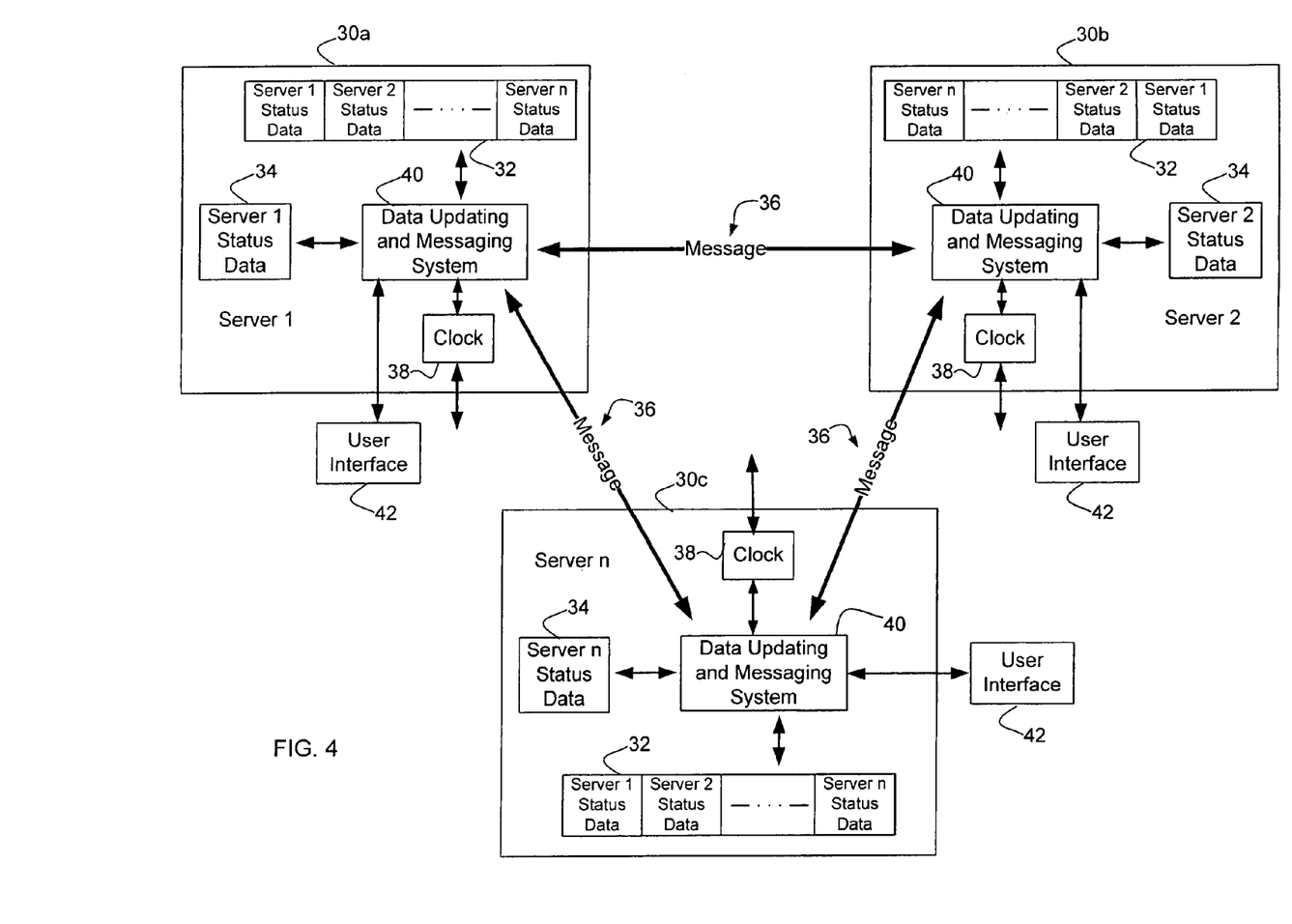
FIG. 4 is a schematic functional block diagram of a distributed messaging system consistent with one embodiment of the present invention.

FIG. 4 shows one exemplary embodiment of a distributed messaging system and method used by servers 30a-30c to share network status data. Although only three servers 30a-30c are shown for simplicity and ease of explanation, those skilled in the art will recognize that the system and method is capable of providing distributed messaging between any number of servers.

Each of the servers 30a-30c is provided with a network status data structure 32, which includes network status data for all of the servers 30a-30c in the network. Each of the servers 30a-30c updates the network status data structure 32 with local network status data 34 specific to that particular server. The data structure 32 has values that be updated at any time, for example, on a per second basis. In an EMS server, for example, the local network status data 34 may include alarm status data and EMS status data obtained by that particular EMS server, for example, from network elements being managed by that EMS server. The network status data structure 32 in an EMS server includes alarm status data and EMS status data for all of the EMS servers in the network. Each EMS server updates a portion of the data structure 32 corresponding to that particular EMS server.

Each of the servers 30a-30c transmits and receives messages 36 including the data structures 32 to one or more of the other servers 30a-30c, thereby exchanging or sharing the current network status data. The messages 36 may be transmitted at user-configurable rates and at predefined times. The message communication may use protocols generally known to those skilled in the art, such as the protocol used by the existing DCN. The servers 30a-30c may include event time stamping clocks 38 that are kept synchronized (e.g., to within one second) to coordinate distributed messaging, as described below. Time synchronization may be accomplished using industry standard technologies, such as the Network Time Protocol (NTP), which are generally known to those of ordinary skill in the art.

When a server 30a receives a message 36 from one of the other servers 30a-30c, the network status data in the message 36 is used to update the network status data structure 32 in the server 30a. Each of the servers 30a-30c thereby maintains current network status data for all of the servers 30a-30c in the network. Each of the servers 30a-30c also includes a data updating and messaging system 40, which handles updating of the data structure 32 and messaging functions. The data updating and messaging system 40 may handle data updating and messaging, for example, in accordance with the star/broadcast method or the CMQ method described below.

Each of the servers 30a-30c may support a user interface 42 such as a graphical user interface (GUI) for displaying certain types of the shared network status data. In an EMS, for example, the user interface 42 may be implemented on a client workstation logged into the EMS server and used to display alarm status information. As network status data is updated (e.g., after receiving a network status data message) in a server 30a, the server 30a may update the user interface 42 accordingly.

Figure 5:
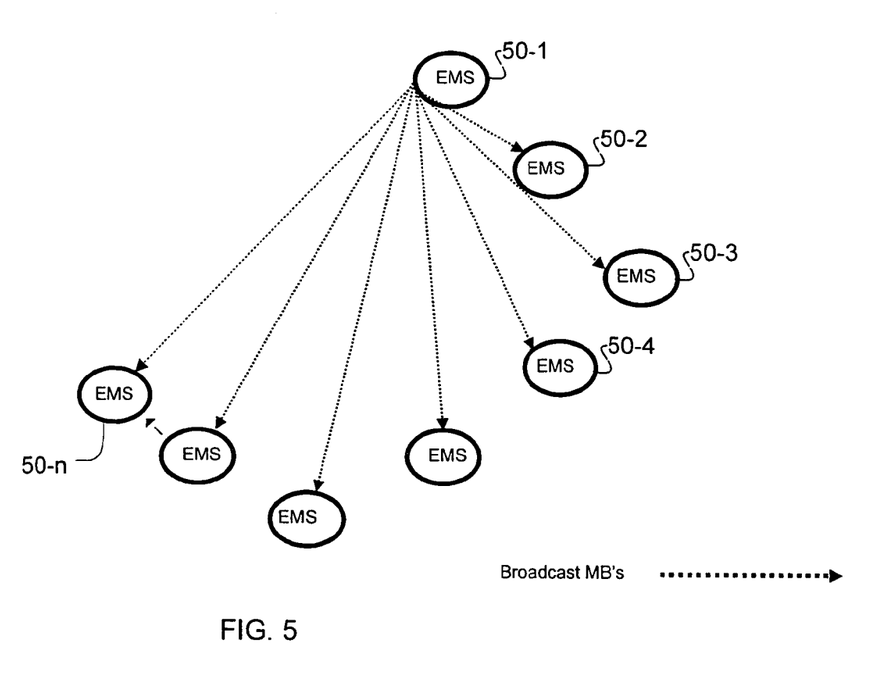
FIG. 5 is a schematic diagram illustrating one embodiment of distributed messaging using a broadcast method.

According to one embodiment, as shown in FIG. 5, distributed messaging may be provided using a star/broadcast method to share network status data between EMS servers 50-1 . . . 50-n. Each of the EMS servers 50-1 . . . 50-n broadcasts or transmits messages to every other available EMS server in the network. For simplicity and ease of explanation, one EMS server 50-1 is shown broadcasting or transmitting its data to the other EMS servers 50-2 . . . 50n. Those skilled in the art will recognize that the other servers 50-2 ... 50-n similarly broadcast messages.

Figure 6:
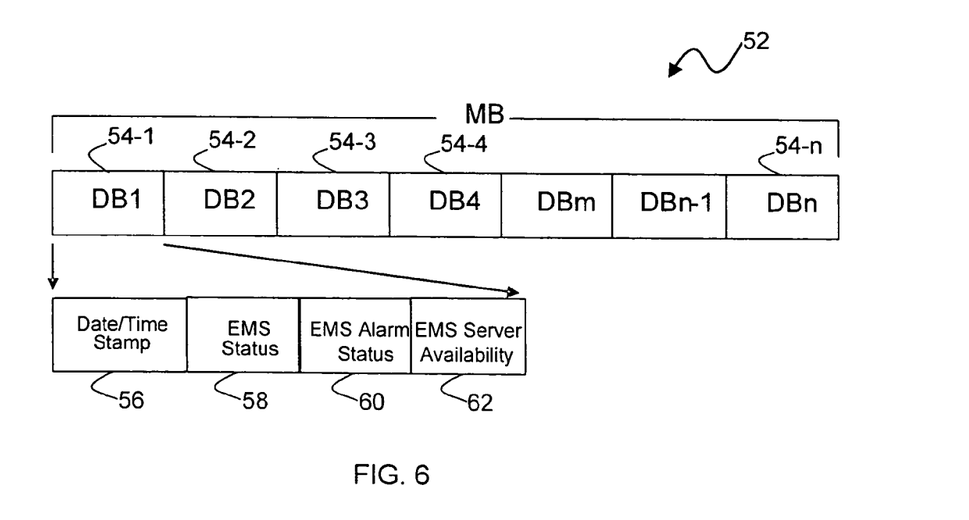
FIG. 6 is a schematic block diagram illustrating one embodiment of a data structure used in the broadcast distributed messaging method.

One embodiment of the data or message structure used with the star/broadcast method is shown in FIG. 6. Each of the EMS servers 50-1 ... 50-n maintains a buffer in memory, referred to as the message buffer (MB) 52, which holds that server's view of the network status data. Each MB 52 may include n data blocks 54-1 ... 54-n (DB1-DBn) for each of the respective n servers 50-1 ... 50-n in the network. Each of the data blocks 54-1 ... 54-n includes, for each of the respective EMS servers 50-1 ... 50-n, the date time stamp 56 of the last update for the data block, EMS status data 58, EMS alarm status data 60, and EMS server availability data 62.

According to the exemplary star/broadcast method, the EMS server 50-1 broadcasts or transmits a message (i.e., a copy of its MB 52) to the other EMS servers 50-2 ... 50-n when the data in the EMS server 50-1 has been updated. The EMS server 50-1 may also broadcast a message after a period of time even if the data has not been updated. This message (referred to as a "keep alive" message) prevents the other servers 50-2 ... 50-n from considering the server 50-1 as not reporting. In one example, each of the EMS servers 50-1 ... 50-n may include a keep alive timer (KAT) that tracks the period of time before sending a keep alive message.

Each of clocks in the EMS servers 50-1 ... 50-n may be time synchronized to allow the messages to be transmitted at different times and to ensure that time stamped values reported are accurate. In one example, each of the EMS servers 50-1 ... 50-n may be assigned a transmit time (TT) for broadcasting a copy of its respective MB 52 to the other EMS servers. The transmit time for a server m may be calculated, for example, according to the algorithm $TTm = o + m*x/n$, where o is a time offset (e.g., in minutes), x is a system wide configuration parameter, and n is the total number of servers. This exemplary algorithm assures that server m will broadcast a copy of its MB at a time different than any of the other n-1 servers, thus preventing collisions and receiver overload in the network.

Each of the EMS servers 50-1 ... 50-n may also monitor whether or not the other EMS servers are reporting. In one example, each of the EMS servers 50-1 ... 50-n can maintain a receive timer (RT) or counter for each of the other servers in the network (i.e., n-1 RT counters for n-1 other servers). The receive timer instance (RTn) for a server n indicates how long the server will wait for a message with updated data or a keep alive message from server n, before considering the server n as not reporting. In this example, the value of the receive timer (RTn) that a server maintains for another server n is greater than the value of the keep alive timer (KAT) maintained by the server n, for example, $RTn = KAT + X$, where $X > 0$. This allows the servers to send keep alive messages before other servers determine that a not reporting status has occurred.

Figure 7:
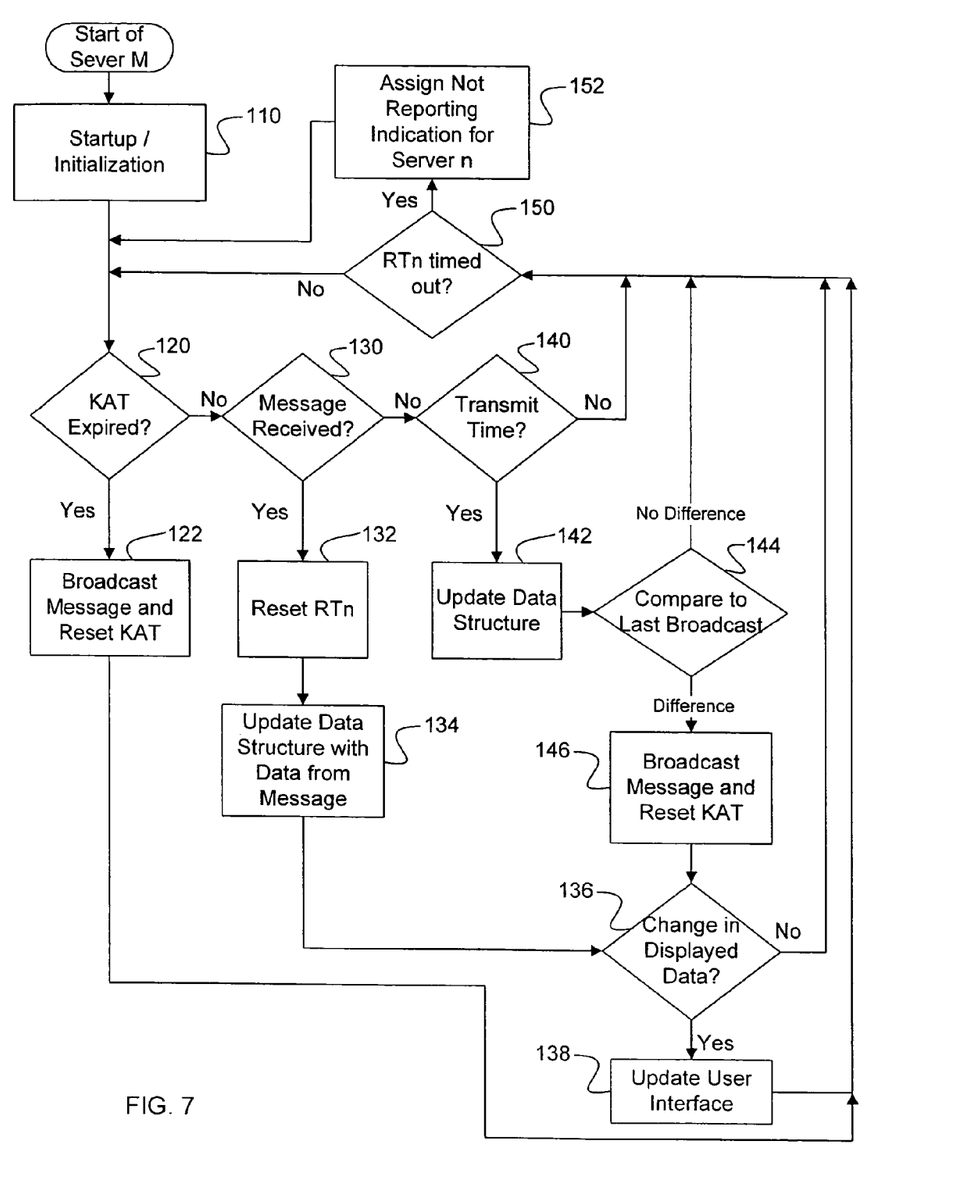
FIG. 7 is a flow chart illustrating one example of a process for updating data and messaging using the broadcast method.

One exemplary process for updating data and messaging in a server using the star/broadcast method is illustrated in FIG. 7. As each server starts up, initialization occurs 110. During initialization, for example, the server assigns the not reporting alarm status indication to each current alarm status for each of the n-1 data blocks in the message buffer, sets the date time stamp of each of the n-1 data blocks in its message buffer to the current time, and clears the network status of each of the n-1 data blocks in its message buffer.

After initialization, the server determines if the server's keep alive timer (KAT) has expired 120, if a message is received from one of the other servers 130, if the server's transmit time (TT) has occurred 140, and/or if a receive time (RT) for any one of the other servers has timed out 150. When the server's keep alive timer expires 120, the server broadcasts a status message (i.e., a keep alive message) even if no status has changed and resets its keep alive timer 122.

If a server receives a message from one of the other servers 130, the receiving server resets the receive timer (RTn) for the transmitting server n 132. The receiving server then updates the data blocks in its message buffer with network status data from the received message 134. For each data block in the received message, other than the data block associated with the receiving server, the receiving server compares the date time stamp in that block to the date time stamp stored in a corresponding data block in its message buffer. If value indicates that the date time stamp is more recent in the data block of the received message, for that data block, the receiving server copies the values of the date time stamp, alarm status data, and EMS status data into the corresponding data block in the message buffer of the receiving server.

If any values of the data displayed on a user interface supported by the receiving server have changed 136, the server may update the user interface accordingly 138. For example, alarm status values displayed on a GUI of a client workstation logged into an EMS server may be updated.

When a transmit time occurs for a server m 140, the server m updates its data block (DBm) in its data structure or message buffer 142. For example, the server m sets the date time stamp in its data block (DBm) to the current date/time, updates its data block (DBm) with its current alarm status, and updates its data block (DBm) with its EMS status. The server m then compares the values in its data block (DBm) to the values in its data block (DBm) in the last message transmitted by the server m 144. If there is a difference in values (i.e., a change in status since the last broadcast), the server m broadcasts the message to the other servers and resets its keep alive timer 146. If the server m detects that any values of the data displayed on a user interface supported by the server m have changed 136, the server m may update the user interface accordingly 138. For example, the GUI of a client workstation logged into an EMS server may display the updated alarm status for each of the n servers as well as the date/time stamp value associated with the alarm status.

If any instance of the receive timer (RTn-1) in a server times out before the server receives a message from the expected transmitting server 150, the server assigns the not reporting alarm status indication for the expected transmitting server 152. The not reporting alarm status indication is assigned to the current alarm status for the data block (DBn) corresponding to the expected transmitting server n in the message buffer for the expected receiving server. The expected receiving server also updates its message buffer by setting the date time stamp in the corresponding data block (DBn) to the current time and clears the status of the corresponding data block (DBn), thus deeming server n not reporting.

Figure 8:
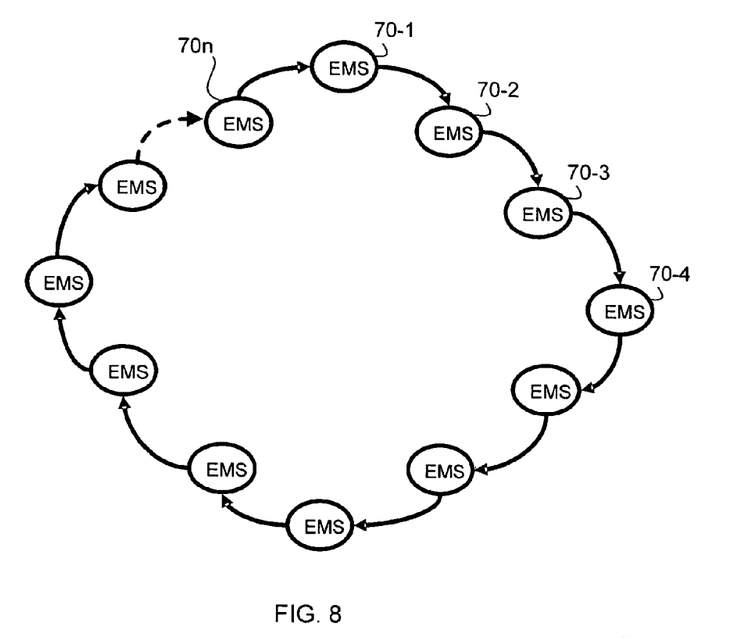
FIG. 8 is a schematic diagram illustrating another embodiment of distributed messaging using a circular message queue (CMQ) method.

According to another embodiment, as shown in FIG. 8, distributed messaging may be provided using a CMQ method to share network status data between EMS servers 70-1 ... 70-n. Each of the EMS servers 70-1 ... 70-n delivers a message to a neighboring EMS server in a predefined order. By providing this circular message flow, the number of messages flowing through the system and the overhead processing for each server 70-1 ... 70-n may be reduced. According to this method, each of the EMS servers 70-1 ... 70-n includes a list containing all of the EMS servers in the network and defining the order in which messages traverse the network. For example, each EMS server 70-1 ... 70-n may be configured with a field modifiable configuration file (FMCF) that includes the default value for the delay time and the DCN addresses (e.g., the IP addresses) of all of the servers. The order of the servers 70-1 . . . 70-$n$ listed in the FMCF defines the flow of the CMQ.

During normal operation, (i.e., all of the EMS servers in the list are properly communicating), each EMS server 70-1 . . . 70-$n$ adds its own network status data (e.g., the alarm status data and EMS status data) to the network status message when it is received. The EMS server 70-1 . . . 70-$n$ then forwards the updated message after a delay time to a neighboring EMS server as defined in the list.

Figure 9:
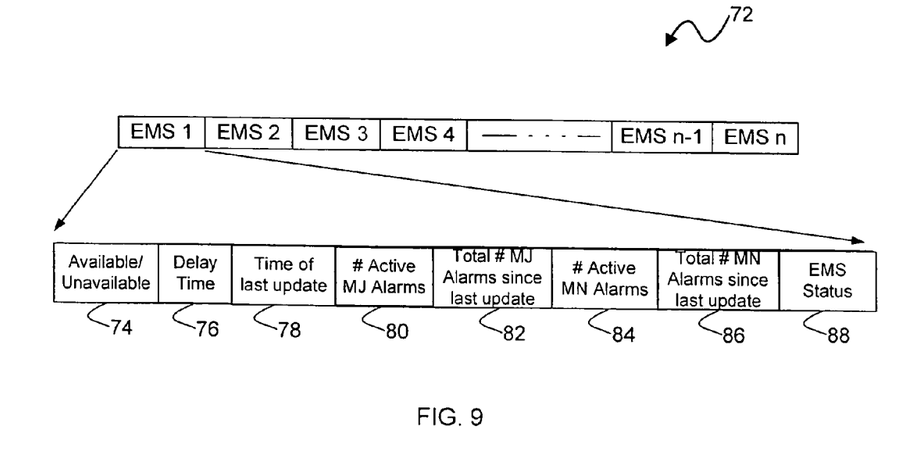
FIG. 9 is a schematic block diagram illustrating one embodiment of a data structure used in the CMQ method.

One embodiment of the data or message structure used with the CMQ method is shown in FIG. 9. The data structure 72 includes, for each EMS in the network, a server availability attribute 74, a delay time attribute 76, a date/time stamp 78, alarm attributes 80-86, and EMS status attributes 88. The server availability attribute 74 indicates if the associated EMS server is "available" or unavailable" in the network. The delay time attribute 76 indicates the period of time (e.g., in seconds) that the associated EMS server delays before forwarding a message. The time stamp 78 indicates the date/time (e.g., the month/day and hours, minutes, and seconds) of the last update for the associated EMS server (i.e., the time of the last message transmittal by the associated EMS server). The alarm attributes 80-86 include current alarm attributes 80, 84 for the number of currently active alarms (major and minor) at the time of update and total alarm attributes 82, 86 for the total number of alarms (major and minor) recorded since the last message transmittal. The total number of major and minor alarms recorded since the last update may account for alarms that transitioned from inactive to active and back to inactive during the time between updates. The EMS server attributes 88 indicate or describe EMS status data.

One embodiment of the CMQ distributed messaging method may also include a recovery method when one or more EMS servers 70-1 . . . 70-$n$ become unreachable or unavailable. According to one exemplary recovery method, each server 70-1 . . . 70-$n$ determines the estimated time that the message should take to traverse the network and return to that server. Each server 70-1 . . . 70-$n$ may determine a timeout time, for example, by summing the delay times for all of the EMS servers that are deemed available, using the delay times in the network status message. If a server does not receive a network status message from its neighbor in the expected time, the server will timeout waiting for the network status message. This indicates that a "break" in the network has occurred preventing communications between all of the servers in the network when a CMQ is used. Such a break may be due to server failure, DCN failure, system maintenance, or other condition.

When a server times out waiting for the message, the server may initiate a recovery procedure by identifying available servers and continuing to send messages to available servers, as described in greater detail below. Each server 70-1 . . . 70-$n$ may use its location in the list of servers (e.g., in the FMCF) to define an offset for timeout values. This ensures that all of the servers 70-1 . . . 70-$n$ in the network are configured with varying timeouts so that recovery may be performed by one server at a time.

Figure 10:
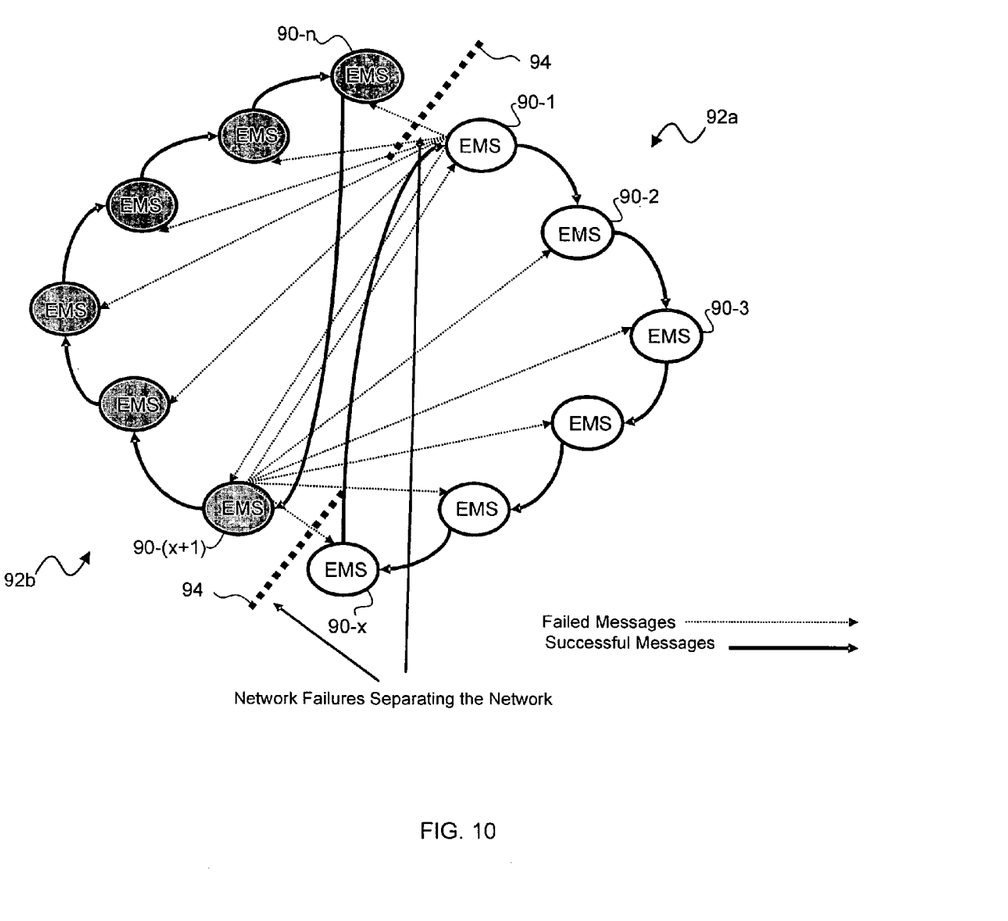
FIG. 10 is a schematic diagram illustrating a further embodiment of distributed messaging using the CMQ method in the event of a network failure.

As a result of the servers continuing to send messages to the available servers, the network may be split into two or more groups of communicating EMS servers, e.g. 90-1 . . . 90-$x$ and 90-($x$+1) . . . 90-$n$, as shown in FIG. 10. This forms multiple CMQ flows 92$a$, 92$b$ that allow distributed messaging to continue despite breaks or network failures 94. The recovery method thus provides a self healing mechanism.

Figure 11:
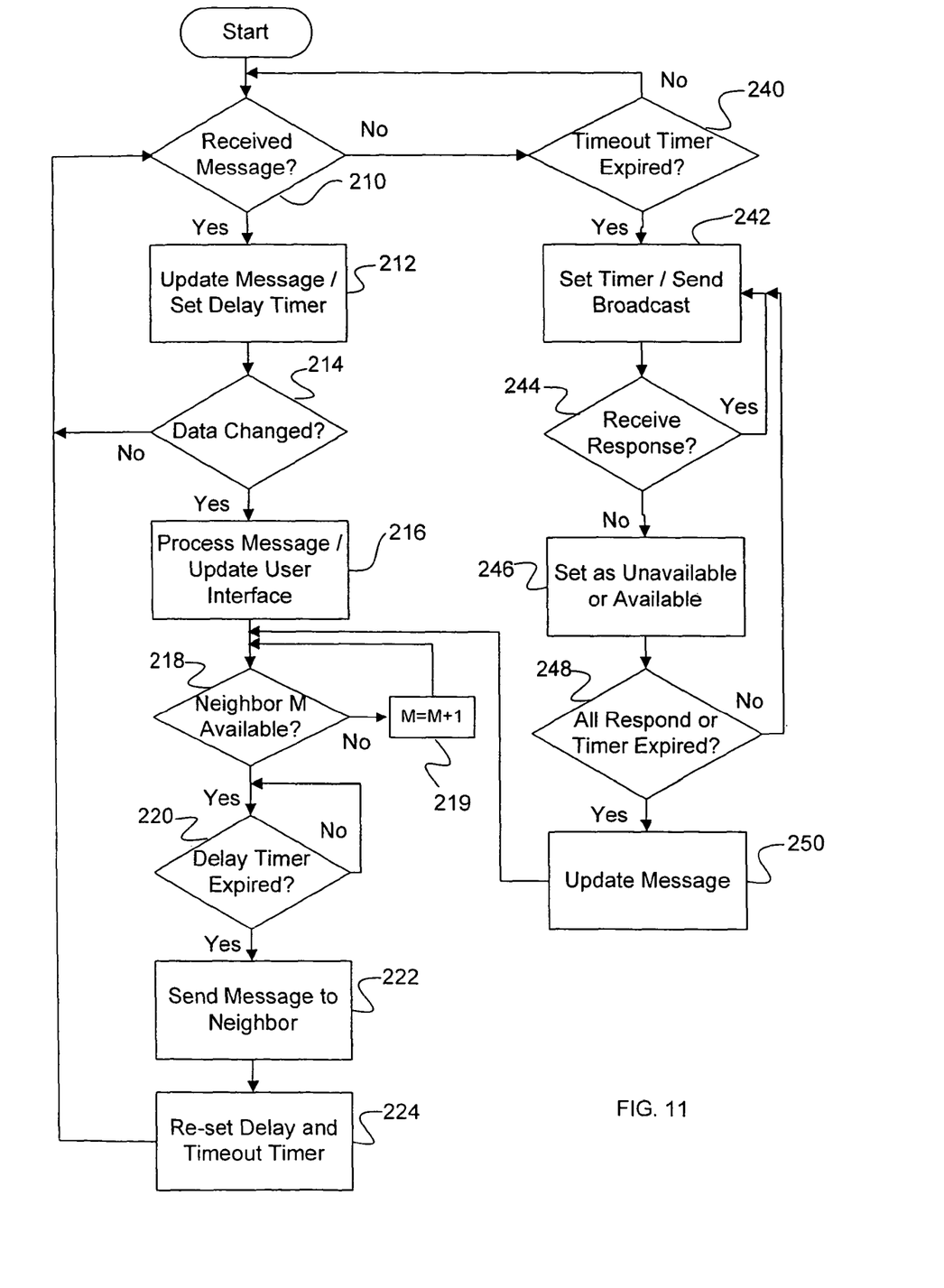
FIG. 11 is a flow chart illustrating one example of a process for updating data and messaging using the CMQ method.

One exemplary process for updating data and messaging in a server using the CMQ method is illustrated in FIG. 11. If a server receives a network status data message 210, the server updates its portion of the message (e.g., with a time stamp and network status data) and sets a delay timer 212. The server compares the values of the updated message to a copy of the last network status data message received by the server 214. If the differences in the values indicate that the network status (e.g., the alarm status and/or EMS status) has changed 214, the message is processed and any user interface supported or managed by that server is updated 216. If there is no change 214 the server awaits another message 210.

The server also determines if the neighboring server is available 218, for example, based on the availability status indicated in the portion of the message corresponding to the neighboring server. If the immediate neighbor is not available, the server checks the availability of the next neighbor 219, 218. If a neighboring server is available and the delay timer has expired 220, the message will be forwarded to the neighbor 222. The delay timer and the timeout timer may then be reset 224 and the server waits for another message 210.

An EMS server may set all of the EMS delay times (i.e., for each EMS server) in the network status data message to zero prior to transmitting the network status message to its neighbor. Passing the network status message through the network without any delays allows an EMS to pass information more quickly through the network. An EMS server that changes the delay times may then reset the delay times to the original settings, for example, when the message returns to the EMS server.

If the timeout timer expires while a server is waiting for a message 240, the server originates an availability status request message broadcast to every other server in the network and sets a timer 242. The server originating the availability status request message is referred to as the originator. When another server receives an availability status request message, the server responds to the originator and resets its own timeout timer. As responses are received 244, the originator server updates the server availability attribute for each server in the network status message 246. When all servers have responded or the timer has expired 248, the network status message is updated with network status data and availability status data 250. The updated network status message may then be forwarded to the next available neighboring server 218, as indicated by the server availability attribute. Each server in the network continues to update the network status message with its status information and forwards it to the next available neighbor.

As shown in FIG. 10, for example, the originator EMS servers 90-1, 90-($x$+1) broadcast status request messages to the other EMS servers. The originator EMS server 90-1 determines that EMS servers 90-($x$+1) . . . 90-$n$ are unavailable and the originator EMS server 90-($x$+1) determines that EMS servers 90-1 . . . 90-$x$ are unavailable. When the message transmission between available EMS servers continues, the EMS network is split and more than one CMQ flow 92$a$, 92$b$ is formed. When the EMS network is split, the originator EMS servers 90-1, 90-($x$+1) receive messages and continue to send availability status messages to all of the unavailable EMS servers and to update the available/unavailable status indicators as appropriate. Each originator EMS server 90-1, 90-($x$+1) continues to send availability status requests to all of the unavailable EMS servers in the network until all respond or until one originator receives an availability request message from another originator. When the problem is resolved, the reception of an availability status request message by an originator server indicates that there is at least one other originator server in the network. The originator server that receives such an availability request message from another originator resets its timeouts and waits for a new message before forwarding a message to its neighboring server.

Embodiments of the distributed messaging system and method can be implemented as a computer program product for use with a computer system. Such implementations include, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements, firmware or as a combination of hardware, software and firmware.

Accordingly, using a distributed messaging system and method allows data to be shared between servers in a network while minimizing reliance on one server. The distributed messaging may also reduce traffic flow and eliminate system bottlenecks.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for sharing network status data between an element management system (EMS) server and a plurality of other EMS servers in an optical communication network wherein each EMS server in the network manages associated network elements and wherein the network status data for each EMS server in the network includes data forwarded to the EMS server from the network elements associated therewith, said method comprising:

providing a data structure in said EMS server, said data structure including network status data associated with all said EMS servers in said network;

receiving at least one message in said EMS server, said received message being sent by at least one of said other EMS servers and said received message including network status data associated with all said EMS servers in said network;

updating said data structure in said EMS server with updated network status data from said received message;

updating said data structure in said EMS server with updated network status data obtained by said EMS server when performing EMS functions;

transmitting at least one message from said EMS server to all of said other EMS servers at a predetermined time, said at least one transmitted message including said updated data structure, said updated data structure comprising network status data associated with all said EMS servers in said network;

providing a list of said other EMS servers in said EMS server, wherein transmitting said at least one message includes transmitting said message to a neighboring one of said EMS servers as according to an order defined by said list of EMS servers;

determining if a predetermined timeout time for receiving said message from a neighboring server has expired;

broadcasting an availability status request message to said other EMS servers if said predetermined timeout time for receiving said message has expired to determine which of said other EMS servers are available EMS servers; and transmitting said message to at least one of said available EMS servers.

2. The method of claim 1 further comprising updating a user interface with said updated network status data from said received message and said updated network status data obtained by said EMS server when performing EMS functions.

3. The method of claim 1 wherein said network status data includes network alarm status data and EMS status data.

4. The method of claim 1 wherein said data structure is provided in a message buffer.

5. The method of claim 1 wherein said data structure includes data blocks corresponding to each of said EMS servers.

6. The method of claim 5 wherein each of said data blocks includes a date/time stamp of a last update for said data block.

7. The method of claim 6 wherein each of said data blocks includes EMS server availability data.

8. The method of claim 1 wherein transmitting said at least one message includes broadcasting said at least one message to other said EMS servers in said network.

9. The method of claim 8 wherein said predetermined time for transmitting is a transmit time for broadcasting.

10. The method of claim 8 further comprising comparing said data structure to a last transmitted message, and wherein said at least one message is transmitted if said data structure has changed from said last transmitted message.

11. The method of claim 10 further comprising broadcasting said at least one transmitted message after a predetermined keep alive time even if said data structure has not changed from said last transmitted message.

12. The method of claim 10 further comprising determining if a message has not been received from at least one of said other EMS servers after a receive time expires.

13. The method of claim 8 wherein said data structure includes data blocks corresponding to said EMS servers in said network, and wherein each of said data blocks includes a date/time stamp of a last update for said data block, EMS status data, EMS alarm status data, and EMS server availability data.

14. The method of claim 1 wherein said predetermined time for transmitting is a predetermined delay time after receiving said message from a neighboring EMS server.

15. The method of claim 1 wherein said at least one message is transmitted to said neighboring EMS server only if said neighboring EMS server is available.

16. The method of claim 1 wherein said data structure includes, for each of said EMS servers, availability data, a delay time, a time stamp of the last message transmittal, and alarm status data.

17. The method of claim 1 further comprising synchronizing a time clock in said EMS server with time clocks in said other EMS servers.

18. A non-transitory machine-readable medium whose contents cause a computer system to perform a method of sharing network status data between an element management system (EMS) server and a plurality of other EMS servers in an optical communication network wherein each EMS server in the network manages associated network elements and wherein the network status data for each EMS server in the network includes data forwarded to the EMS server from the network elements associated therewith, said method comprising:

provided a data structure in said EMS server, said data structure including network status data associated with all said EMS servers in said network;

receiving at least one message in said EMS server, said received message being sent by at least one of said other EMS servers and said received message including network status data associated with all said EMS servers in said network;

updating said data structure in said EMS server with updated network status data from said received message;

updating said data structure in said EMS server with updated network status data obtained by said EMS server when performing EMS functions;

transmitting at least one message from said EMS server to all of said other EMS servers at a predetermined time, said at least one transmitted message including said updated data structure, said updated data structure comprising network status data associated with all said EMS servers in said network;

providing a list of said other EMS servers in said EMS server, wherein transmitting said at least one message includes transmitting said message to a neighboring one of said EMS servers as according to an order defined by said list of EMS servers;

determining if a predetermined timeout time for receiving one of said messages from a neighboring server has expired;

broadcasting an availability status request message to said other EMS servers if said predetermined timeout time for receiving said one of said messages has expired to determine which of said other EMS servers are available EMS servers; and transmitting said message to at least one of said available EMS servers.

19. The non-transitory machine-readable medium of claim 18 wherein transmitting said at least one message includes broadcasting said at least one message to other said EMS servers in said network at a predetermined transmit time.

20. The non-transitory machine-readable medium of claim 19 wherein said data structure includes data blocks corresponding to said EMS servers in said network, and wherein each of said data blocks includes a date/time stamp of a last update for said data block, EMS status data, EMS alarm status data, and EMS server availability data.

21. The non-transitory machine-readable medium of claim 19 wherein said method further comprises comparing said data structure to a last transmitted message, and wherein said at least one message is transmitted if said data structure has changed from said last transmitted message or if after a predetermined keep alive time even if said data structure has not changed from said last transmitted message.

22. The non-transitory machine-readable medium of claim 18 wherein said data structure includes, for said EMS servers, availability data, a delay time, a time stamp of the last message transmittal, and alarm status data.

23. The non-transitory machine-readable medium of claim 18 wherein said method further comprises synchronizing a time clock in said EMS server with time clocks in other said EMS servers.

24. A method for distributed messaging of network status data between an element management system (EMS) servers in an optical communication network wherein each of the EMS servers in the network manages associated network elements and wherein the network status data for each of the EMS servers in the network includes data forwarded to the EMS server from the network elements associated therewith, said method comprising:

providing a message buffer in each of said EMS servers, said message buffer including data blocks with network status data associated with all said EMS servers in said network, wherein said network status data in each of said data blocks includes EMS alarm status data and EMS status data;

updating said message buffer in each of said EMS servers with updated network status data obtained by each of said EMS servers;

broadcasting messages from each of said EMS servers at different transmit times, each of said messages including a copy of said message buffer from a respective one of said EMS servers, said copy of said message buffer including data blocks with network status data associated with all said EMS servers in said network;

determining if a predetermined timeout time for receiving said message at a first one of said EMS servers from a second one of said EMS servers has expired;

broadcasting an availability status request message from said first one of said EMS severs to other ones of said EMS servers if said predetermined timeout time for receiving said message has expired to determine which of said other ones of said EMS servers are available EMS servers; and updating said message buffers in each of said EMS available servers based on said network status data in said messages received by said EMS available servers.

25. The method of claim 24 wherein each of said data blocks includes a date/time stamp of a last update of said data block and EMS server availability data.

26. The method of claim 24 further comprising comparing said data blocks in said message buffer to said data blocks in a last transmitted message, wherein each of said EMS servers broadcasts said message if said data blocks has changed from a last transmitted message.

27. The method of claim 26 further comprising broadcasting said messages if a predetermined keep alive time expires from said last transmitted message even if said data blocks does not change from said last transmitted message.

28. The method of claim 24 further comprising updating user interfaces managed by said EMS servers with updated network status data.

29. The method of claim 24 further comprising synchronizing time clocks in said EMS servers.

30. A distributed network management system (NMS) comprising:

a plurality of element management systems (EMSs) for managing network elements, each of said EMSs comprising hardware and including a data structure containing network status data associated with each of said EMSs;

wherein each of said EMSs is configured to obtain network status data from said network elements being managed;

wherein each of said EMSs is configured to transmit by broadcasting and receive messages directly to and from other said EMSs in said network at a predetermined transmit time, said messages including said data structures from respective said EMSs;

wherein each of said EMSs is configured to update said data structure with said network status data obtained from said network elements being managed and with said network status data in said messages received from other said EMSs;

wherein at least a first one of said EMSs is configured to determine if a predetermined timeout time for receiving one of said messages from a second one of said EMSs has expired;

wherein said first one of said EMSs is configured to broadcast an availability status request message to other ones of said EMSs if said predetermined timeout time for receiving said one of said messages has expired to determine which of said other ones of said EMSs are available EMSs; and wherein said first one of said EMSs is configured to broadcast said messages to said available EMSs.

31. The distributed network management system of claim 30 wherein each of said EMSs is configured to transmit a message by transmitting said message to a neighboring EMS, as defined by a list of said EMSs, after a predetermined delay from when said message is received.

32. The distributed network management system of claim 30 wherein each of said EMSs is time synchronized with other said EMSs.

* * * * *